(12) United States Patent
Shau (10) Patent No.: US 9,536,690 B2
(45) Date of Patent: Jan. 3, 2017

(54) HIGH PERFORMANCE POWER INPUT CIRCUITS USING SYNCHRONIZED MECHANICAL SWITCHES

(71) Applicant: Jeng-Jye Shau, Palo Alto, CA (US)

(72) Inventor: Jeng-Jye Shau, Palo Alto, CA (US)

( * ) Notice: Subject to any disclaimer, the term of this patent is extended or adjusted under 35 U.S.C. 154(b) by 344 days.

(21) Appl. No.: 14/070,375

(22) Filed: Nov. 1, 2013

(65) Prior Publication Data
US 2015/0123493 A1    May 7, 2015

(51) Int. Cl.
| | |
|---|---|
| *H01H 45/00* | (2006.01) |
| *H02M 1/24* | (2006.01) |
| *H02M 7/32* | (2006.01) |
| *H01H 1/40* | (2006.01) |
| *H01H 50/54* | (2006.01) |
| *H01H 50/64* | (2006.01) |
| *H01H 3/40* | (2006.01) |

(52) U.S. Cl.
CPC .............. *H01H 45/00* (2013.01); *H01H 1/403* (2013.01); *H01H 50/54* (2013.01); *H01H 50/64* (2013.01); *H02M 1/24* (2013.01); *H02M 7/32* (2013.01); *H01H 3/40* (2013.01); *Y10T 307/76* (2015.04)

(58) Field of Classification Search
CPC ........ H01H 45/00; H01H 34/14; H01H 35/14; H01H 1/403; H01H 50/54; H01H 50/64; H01H 3/40; H02M 1/24; H02M 7/32; H02M 1/20; Y10T 307/76; G01P 15/135
See application file for complete search history.

(56) References Cited

U.S. PATENT DOCUMENTS

| | | | | |
|---|---|---|---|---|
| 3,742,478 | A * | 6/1973 | Johnson | G08B 13/1436 200/61.45 R |
| 5,153,566 | A * | 10/1992 | Yun | G08B 13/1436 200/61.45 R |
| 6,674,028 | B1 * | 1/2004 | Berton | G08B 3/10 200/61.45 R |
| 8,402,597 | B2 * | 3/2013 | Rosenzweig | A47L 13/22 15/320 |
| 8,490,306 | B2 * | 7/2013 | Guo | B42D 15/022 40/124.03 |
| 2005/0217371 | A1 * | 10/2005 | Wang | G01P 15/00 73/488 |

* cited by examiner

*Primary Examiner* — Michael Zarroli

(57) ABSTRACT

Synchronized mechanical switches are configured to support electrical switching circuits operating at frequencies equal to or higher than the frequency of the primary AC power supply. Due to near perfect impedances of mechanical switches as well as accurate timing control mechanisms, the mechanical switching circuits provide timely electrical connections to the terminals of the primary AC power supply to generate proper waveforms suitable to power next stage electrical circuits without the need to use semiconductor devices.

20 Claims, 9 Drawing Sheets

*FIG. 2(a) AC voltage source*

*FIG. 2(b) Prior art rectified voltage*

*FIG. 2(c) Prior art rectified voltage on capacitor*

FIG. 3(c) > Vee

FIG. 3(d) < Vee

FIG. 5(a) Vtt

FIG. 5(b)

FIG. 5(c) -Vtt

FIG. 5(d)

FIG. 5(e) other voltages

FIG. 5(f)

FIG. 6(a) Vtt

FIG. 6(b)

FIG. 6(c) Vtt/2

FIG. 6(d)

FIG. 6(e) other voltages

FIG. 6(f)

FIG. 6(g) -Vtt/2

FIG. 6(h)

FIG. 6(i) -Vtt

FIG. 6(j)

FIG. 6(k) other voltages

FIG. 7(c) Vtt

FIG. 7(d)

FIG. 7(e) -Vtt

FIG. 7(f)

HIGH PERFORMANCE POWER INPUT CIRCUITS USING SYNCHRONIZED MECHANICAL SWITCHES

BACKGROUND OF THE INVENTION

The present invention relates to electrical switching circuits supported by synchronized mechanical switches, and more particularly to electrical switching circuits used for power input circuits.

Most electrical appliances are powered by the primary power supply in a building. In North America, the primary power supply is typically an alternating current (AC), 110 volts, 60 cycles per second (HZ) voltage source. The primary power supply sources in other parts of the world vary in voltage and frequency, but all of them are AC voltage sources at voltages higher than 100 volts. Most electrical components cannot operate directly under the primary power supply. It is therefore necessary to use power input circuits such as rectifying circuits or voltage converting circuits to convert the high voltage AC power input into power sources that are suitable for electrical components.

Figure 1A:
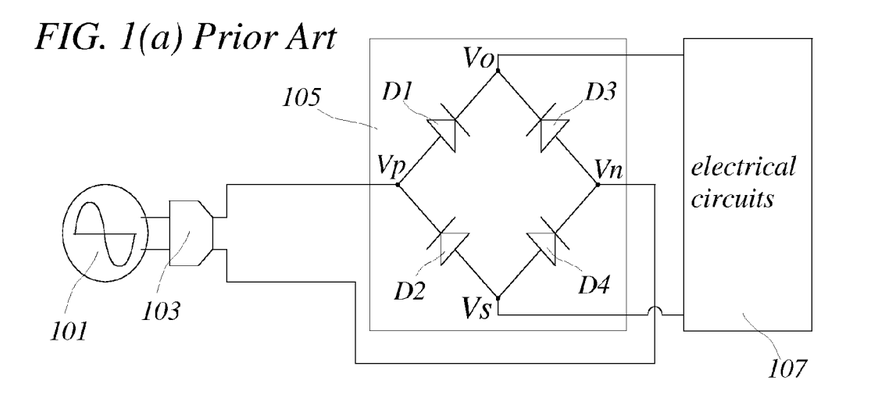
Figure 1B:
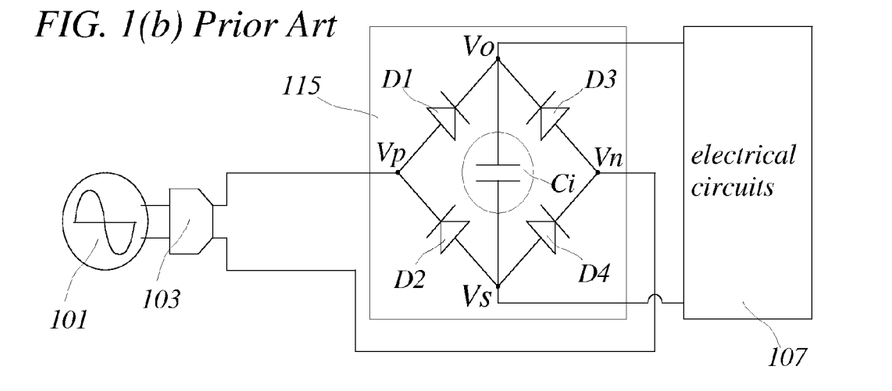
Figure 1C:
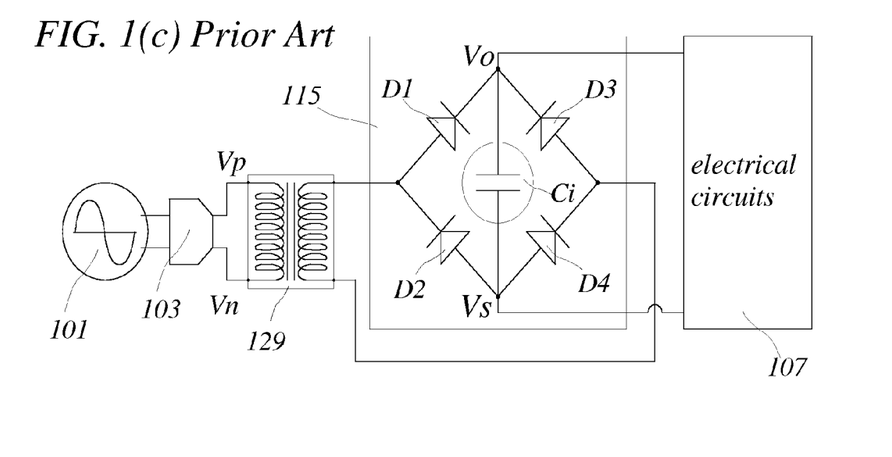
Figure 2A:
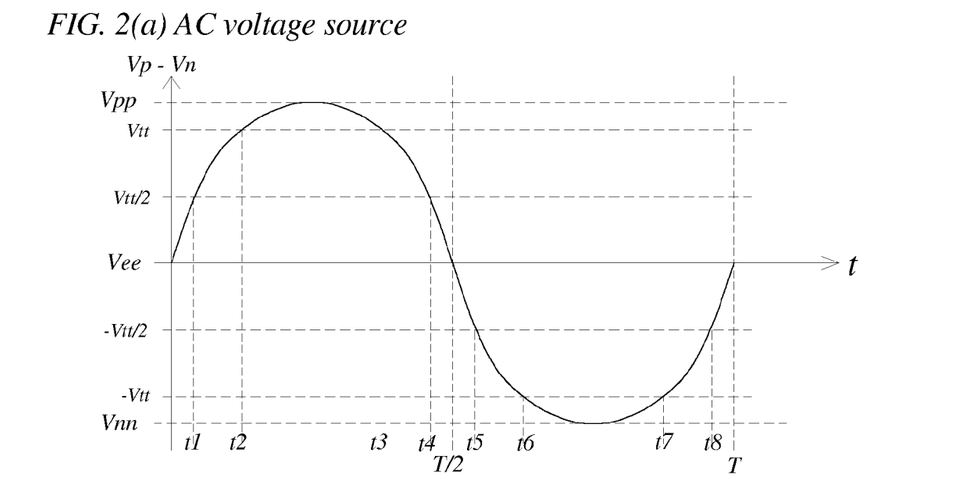
FIG. 2(a) shows a typical waveform of primary power sources.
Figure 2B:
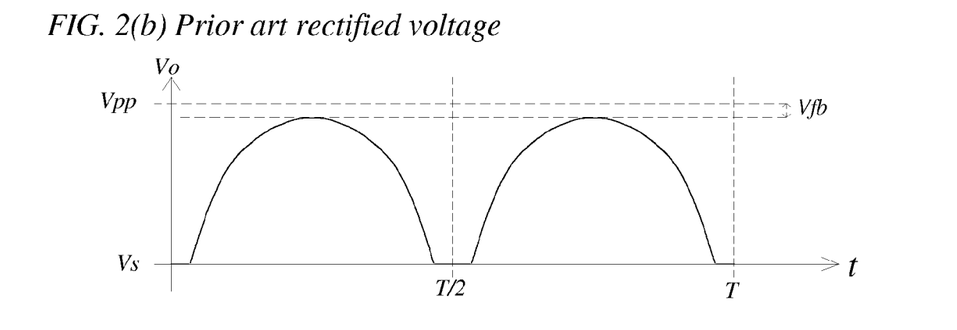
FIG. 2(b) shows the output waveform of the circuit in FIG. 1(a)
Figure 2C:
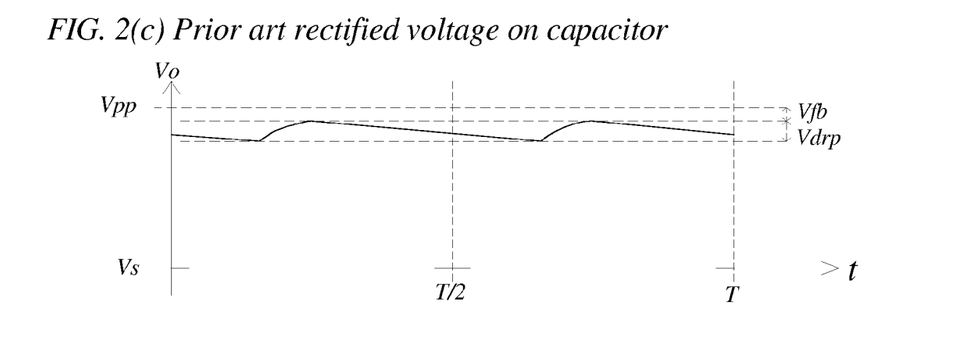
FIG. 2(c) shows the output waveform of the circuit in FIG. 1(b)

FIGS. 1(a-c) are symbolic diagrams showing the most common prior art power input circuits. For the example shown in FIG. 1(a), electrical circuits (107) are using electrical power supplied through a power socket (103) that is connected to the AC primary power supply (101) in a building, while a power input circuit (105) is placed between the AC primary power supply and the electrical circuits (107). For this example, the power input circuit (105) is a bridge rectifier comprising 4 semiconductor diodes (D1-D4). FIG. 2(a) shows a typical waveform of the voltage between the power input connections (Vp, Vn) of the power input circuits as a function of time (t) in a period (T); in the first half period (T/2), the input voltage is positive and peaks at a voltage Vpp; in the second half period, the input voltage changes sign, and swings to negative peak voltage (Vnn) of about the same amplitude. Many electrical components, such as integrated circuits (IC) or aluminum capacitors can only operate when the voltage does not change sign; otherwise those components would burn out. It is therefore necessary to use rectifying circuits, such as the bridge rectifier (105) in FIG. 1(a), to provide rectified power voltages that do not change sign. FIG. 2(b) shows a typical waveform of the voltage between the output terminals (Vo, Vs) of the bridge rectifier (105) in FIG. 1(a). In the first half period (T/2), the output voltage equals the input voltage minus a voltage drop (Vfb); in the second half period, the output voltage equals the absolute value of the input voltage minus Vfb, as shown in FIG. 2(b). The voltage drop Vfb is caused by the forward biased voltage drop of two semiconductor diodes, and Vfb is typically around 1.4 volts. This voltage drop (Vfb) wastes energy, and the wasted energy turns into heat concentrated on the diodes (D1-D4) in the bridge rectifier (105). Therefore, the diodes used for power input circuits are typically special high power diodes equipped with heat sinks. Those diodes (D1-D4) also need to tolerate reverse bias voltages higher than 200 volts. Such high power diodes are bulky and expensive. It is therefore highly desirable to develop rectifying circuits that do not need to use semiconductor diodes. Many electrical components prefer to operate under stable voltages; the voltage waveform in FIG. 2(b) cannot support those electrical components. The most common prior art solution is to place an input storage capacitor (Ci) between the output terminals (Vo, Vs) of the diode bridge, as shown by the symbolic diagram in FIG. 1(b). FIG. 2(c) shows a typical output waveform of the prior art power input circuit (115) in FIG. 1(b). When the input voltage swings toward Vpp or Vnn, the input voltage source (101) charges the storage capacitor (Ci) to a peak voltage (Vpp-Vfb), and then the voltage starts to drop due to power consumed by electrical circuits (107), as shown in FIG. 2(c). This voltage drop (Vdrp) causes undesirable ripples on the output voltage. The amplitude of Vdrp increases when the supported electrical circuits (107) consume more power, and decreases with a larger storage capacitor (Ci). A typical prior art method to reduce this voltage ripple is to use filters. However, power input filters operating at the frequency of primary power supply are typically bulky and expensive. It is therefore highly desirable to develop input circuits that can reduce Vdrp to achieve better voltage stability. In addition, the prior art power input circuit (115) only provides input current when the voltage of the primary power supply is near peak amplitude, while almost no input currents are provided at other times. It is highly desirable to develop input circuits that utilize power more evenly.

The output voltage of the prior art rectifiers (105, 115) always peaks at (Vpp-Vfb), which is typically higher than 150 volts. Many electrical components cannot tolerate such high voltage. It is therefore a common practice to use voltage converters that provide output voltages at voltage levels proper for common circuits. The most common prior art method is to use a transformer (129) before the rectifier (115) as shown in FIG. 1(c). Transformers typically can achieve better than 95% power efficiency while reducing the amplitude of the power input voltage by a pre-determined factor, but transformers that operate at the frequency of primary power supply are typically heavy and bulky. It is therefore highly desirable to provide high efficiency voltage converters that are light and small.

These problems caused by transformers and semiconductor rectifiers can be reduced by prior art high frequency switching circuits using semiconductor switches, but semiconductor switches introduce other problems.

An ideal electrical switch should have zero impedance when the switch is on and infinite impedance when the switch is off. It can conduct infinite current while on, and tolerate infinite voltage while off. An ideal electrical switch also requires zero time to switch between different states, and consumes no power.

There are no ideal switches in practice. The switches used in electrical switching circuits are typically semiconductor devices such as field effect transistors or bipolar transistors. Semiconductor devices can switch between a high conductive state and high resistive state with excellent timing control. They are fast, accurate, cost-efficient, reliable, and small. For low voltage, low power applications, semiconductor switches are very close to ideal switches. However, semiconductor switches typically have relatively low breakdown voltages, making them less useful in supporting high voltage applications. Semiconductor switches operating at voltages higher than 12 volts require special manufacturing processes, and those high voltage semiconductor switches are typically slower, less accurate, and more expensive. Semiconductor devices conduct electrical current through semiconductors, so that the on-resistance of semiconductor devices is typically larger than that of direct connections between electrical conductors. This on-resistance of semiconductor devices is typically not an issue for low power applications, but can be a significant limitation for high power applications.

A mechanical switch is defined as an electrical switch that comprises a movable conductor that connects or disconnects its terminals according to the positions of the movable conductor, and that the electrical connections made by the mechanical switch are formed by direct contact between electrical conductors. The on-impedance of a mechanical switch can be very close to that of an ideal switch because electrical connections are formed by direct contact between electrical conductors. Mechanical switches typically can tolerate high voltages because conductors are physically separated in the off state. Due to their near perfect on/off impedances, mechanical switches are widely used for high voltage and/or high power circuits. However, switching a mechanical switch requires changing the position of a movable conductor, which is typically much slower compared to semiconductor switches. It is also difficult to synchronize the motion of many movable structures in different mechanical switches. Therefore, mechanical switches are typically considered useless for synchronized switching circuits that require accurate timing control at high frequencies.

It is therefore highly desirable to develop switches that have excellent on/off impedances like mechanical switches, and also support accurate timing control useful for synchronized high frequency switching circuits.

SUMMARY OF THE PREFERRED EMBODIMENTS

A primary objective of the preferred embodiments is, therefore, to improve the power efficiency and cost efficiency of power input circuits. An objective of the preferred embodiment is to remove power loss caused by forward bias voltage drop of semiconductor diodes. Another objective of the preferred embodiment is to reduce voltage drop caused by output loading. Another primary objective of the preferred embodiments is to provide mechanical switches that can support high frequency synchronized switching circuits. An objective of the preferred embodiment is to support high voltage switching circuits at high energy efficiency. Another primary objective of the preferred embodiments is to reduce the size and weight of power input circuits. These and other objectives are assisted by mechanical switches with synchronized movable conductors used to support power input circuits.

While the novel features of the invention are set forth with particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 1(a-c) are symbolic diagrams illustrating prior art power input circuits;

FIGS. 3(c, d) illustrate operations of the movable rod in FIG. 3(b) on the printed circuit board in FIG. 3(a);

FIGS. 4(b, c) show examples of the output waveforms when the electrical switching circuit in FIG. 3(a) is using the mechanical switches illustrated in FIGS. 5(a-f);

FIGS. 5(a-f) illustrate examples of mechanical switches used for the electric circuit in FIG. 3(a) that support rectifying operations without using semiconductor diodes;

FIGS. 6(a-l) illustrate examples of mechanical switches used for the electric circuit in FIG. 3(a) that support the functions of voltage converters; and FIGS. 7(a-f) are symbolic diagrams illustrating exemplary structures of an embodiment of the present invention that use a rotary rod to synchronize switching operations of mechanical switches.

DETAILED DESCRIPTION OF THE PREFERRED EMBODIMENTS

Figure 3A:
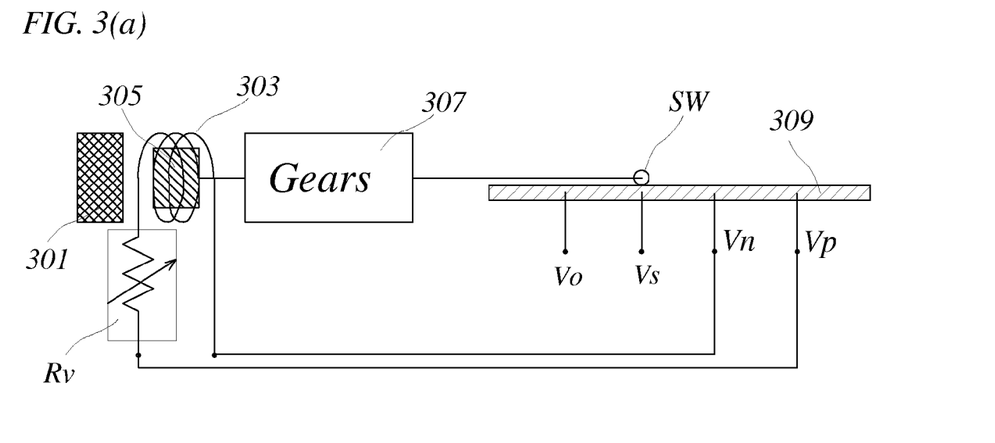
FIG. 3(a) is a symbolic diagram illustrating an exemplary embodiment of the present invention.

FIG. 3(a) is a symbolic diagram illustrating an exemplary embodiment of the present invention. In this example, Vp and Vn are two electrical power input connections that allow electrically operated equipment to be connected to two terminals of the primary AC power supply in a building. Details of the connections from Vp, Vn to the primary AC power supply are not shown in our examples. Vp and Vn can be connected to two terminals of a power socket or a power plug. Electrical components, such as fuses, protection circuits, on/off switches, lamps, and light emitting diodes, also can be connected between those power input connections (Vp, Vn) and primary power lines. At operating conditions, Vp and Vn should be electrically connected to the primary AC power supply through electrical conducting paths, which may include other components such as fuses, protection circuits, on/off switches, lamps, and light emitting diodes.

In this example, Vp and Vn are connected to electrical components mounted on a printed circuit board (309). Vn is also connected to one terminal of a magnetic coil (303). The other terminal of the magnetic coil (303) is connected to one terminal of a variable resistor (Rv), while the other end of the variable resistor is connected to Vp, as illustrated in FIG. 3(a). An iron core (305) is placed inside of the magnetic coil (303), which is placed near a permanent magnet (301). The iron core is connected to a set of gears (307) that control the position of a movable rod (SW) which moves on top of the printed circuit board (309). When an electrical current flows through the magnetic coil (303), the magnetic force between the iron core (305) and the magnet (301) cause the iron core to push or pull against the gears (307). The gears magnify the motions of the iron core, and change the positions of the movable rod (SW) accordingly. The relationship between the displacement of the movable rod (SW) and the input voltage amplitude can be calibrated by adjusting the value of the variable resistor (Rv) and/or the configurations of the gears (307). In this example, we will assume that the position of the movable rod (SW) is adjusted to be a function of the voltage difference between the two power input connections (Vp, Vn).

Figure 3B:
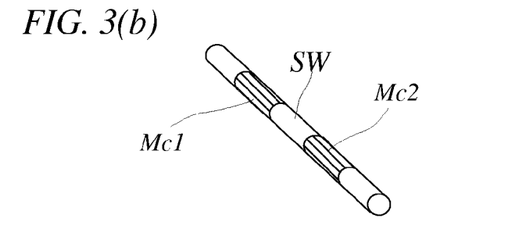
FIG. 3(b) shows an example of the movable rod in FIG. 3(a)

FIG. 3(b) is a three-dimensional diagram illustrating structures of the movable rod (SW) in FIG. 3(a). This movable rod (SW) is an insulator rod that comprises two conductor rings (Mc1, Mc2). When the input voltage on the power input connections (Vp, Vn) changes, the movable rod (SW) changes position, and the conductor rings (Mc1, Mc2) make electrical contacts with conductors on top of the printed circuit board.

FIGS. 3(c, d) are three-dimensional diagrams illustrating the structures of one embodiment of the printed circuit board (309) in FIG. 3(a). In this example, an output voltage ground connection (Vs) is connected to a conductor pad (31) at the edge of the printed circuit board (309), while Vs is also connected to a conductor line (35) on the surface of the printed circuit board (309). An output voltage connection (Vo) is connected to a conductor pad (33) at the edge of the printed circuit board (309), while Vo is also connected to a conductor line (36) on the surface of the printed circuit board (309). The power input connection Vn is connected to a conductor pad (32) at the edge of the printed circuit board (309) while Vn is also connected to a conductor line (41) in the second row. This conductor line (41) ends at a position that is equivalent to the position of the movable rod (SW) when the input voltage is at a predefined critical voltage (Vee), as illustrated by a dashed line in FIGS. 3(c, d). To the left hand side of the dashed line, Vn is connected to another exposed conduction line (42) in the bottom row. The electrical connection between those two conduction lines (41, 42) are connected under the surface of the printed circuit board (309), which is not shown in our figures. Electrical connections formed under the surface of printed circuit boards are not shown in our figures to avoid over complexity of the figures. In our examples, we will follow common practices in the electrical industry so that electrically connected conductors on printed circuit boards will be represented by labeling the names of the electrical signal on those conductors so that when two conductors are named with the same label, those two conductors are electrically connected by hidden connections in the printed circuit boards. In FIGS. 3(c, d), the other power input connection Vp is connected to a conductor pad (34) at the edge of the printed circuit board (309) while Vp is also connected to an exposed conductor line (43) next to the conductor line (36) connected to Vo. This conductor line (43) ends at a position that is equivalent to the position of the movable rod (SW) when the input voltage is at a predefined critical voltage (Vee). To the left hand side of the dashed line, Vp is connected to another exposed conduction line (44) next to the conductor line (35) connected to Vs.

Figure 3C:
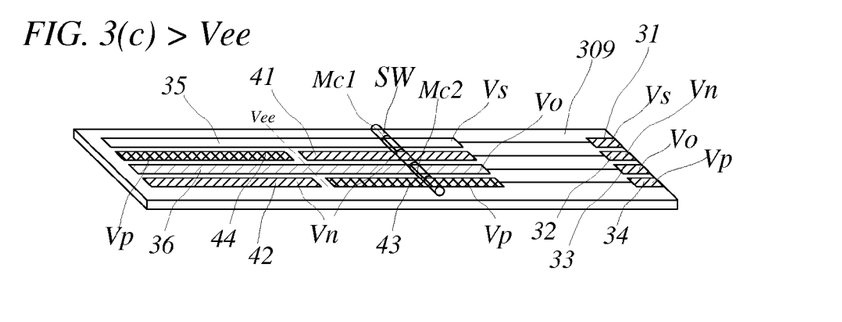
Figure 3D:
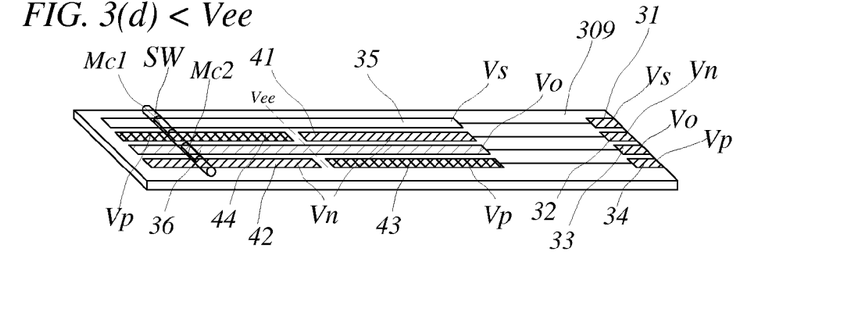
Figure 4A:
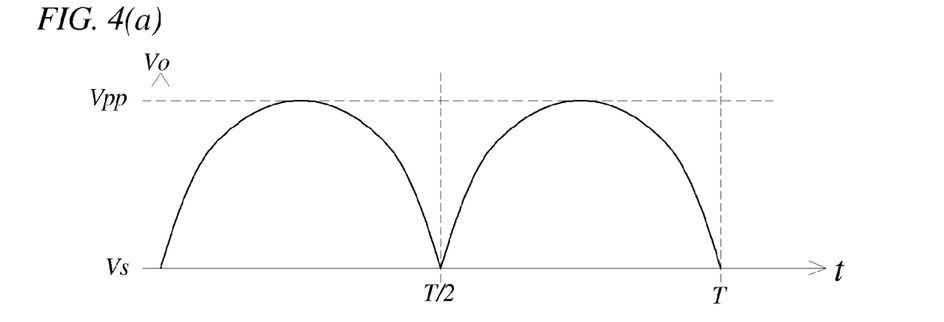
FIG. 4(a) shows an example of the output waveform when the electrical switching circuit in FIG. 3(a) is using the mechanical switches illustrated in FIGS. 3(b-d)

The first conductor ring (Mc1) on the movable rod (SW) and top two rows of conductor lines (35, 41, 44) on the printed circuit board (309) form a mechanical switch that provides switching configurations to turn on electrical connections from Vs to Vp or Vn depending on the positions of the first movable conductor ring (MC1). The second conductor ring (Mc2) on the movable rod (SW) and bottom two rows of conductor lines (36, 42, 43) on the printed circuit board (309) form another mechanical switch that provides switching configurations to turn on electrical connections from Vo to Vn or Vp depending on the positions of the movable conductor ring (Mc2). The motions of the movable conductor rings (Mc1, Mc2) are controlled so that when the voltage difference between Vp and Vn is higher than Vee, Vo can only connect to Vp but not to Vn, and Vs can only connect to Vn but not to Vp, as illustrated by FIG. 3(c); and when the voltage difference between Vp and Vn is lower than Vee, Vo can only connect to Vn but not to Vp, and Vs can only connect to Vp but not to Vn, as illustrated by FIG. 3(d). These mechanical switches are switching at a frequency that is twice the frequency of the primary AC power supply, and the circuit provides rectified output voltages with an output waveform shown in FIG. 4(a). This output waveform is similar to that of the prior art rectifier shown in FIG. 2(b) except that there is no forward biased voltage drop (Vfb) because the rectifying circuits of the present invention do not need to use semiconductor diodes. Therefore, there is no power loss due to voltage drop Vfb, and no need to use heat sinks. Operations of mechanical switches require a small amount of energy, which can be designed to be significantly lower than the energy loss of prior art diodes. Peak power efficiency better than 95% or better than 99% can be achieved with proper design of the control mechanisms. The movable conductor rings (Mc1, Mc2) that control the mechanical switches make electrical connections in rotational motions in order to minimize friction. Mc1 and Mc2 are attached to the same movable rod (SW) to achieve better timing control. Comparing to a conventional voltage rectifier that uses semiconductor devices, the mechanical switches used in the above examples are more efficient at high power and/or high voltage applications due to the near-perfect impedances of mechanical switches. Circuits of the present invention typically are built-in with surge protection because the movable rod (SW) would simply move out of range when the input voltages are out of range, and the output would be open during power surges.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, the critical voltage (Vee) in the above example is chosen to be the average of primary AC power sources as illustrated in FIG. 2(a), but Vee can be any voltage between Vpp and Vnn. For example, Vee can be the voltage on one of the power input connections (Vp, Vn). The movable rod in the above example is a single piece of rod, while the movable rod can be designed in a wide variety of ways. Sometimes the movable rod can be integrated from multiple pieces to form one structure that moves as a single solid structure; under such situations, the integrated structure is still considered as a single solid structure as long as the overall motion is synchronized. Instead of moving the conductor rings (Mc1, Mc2) against a steady printed circuit board, we also can move a printed circuit board against conductor rings at fixed positions. Instead of using exposed conductors on the same side of a printed circuit board to form parts of mechanical switches, we can utilize both sides of the printed circuit board. The above example supports the functions of a rectifying circuit while switching circuits of the present invention can support wide varieties of functions.

The symbolic diagrams in FIGS. 5(a-f) illustrate another embodiment of the printed circuit board (309) in FIG. 3(a) that supports the functions of a voltage converter. In this example, a storage capacitor (Ci) is placed on the printed circuit board (309). The negative terminal (Ni) of the capacitor (Ci) is connected to a conductor line at the top row of the printed circuit board, and the positive terminal (Pi) of the capacitor (Ci) is connected to another conductor line at the third row of the printed circuit board, as shown in FIGS. 5(a, c, e). The output voltage ground connection Vs is connected to an edge pad and three conductor lines in the second row, as labeled "Vs" in FIGS. 5(a, c, e). Electrical connections formed under the surface of printed circuit boards are not shown in our figures to avoid over complexity of the figures. In our examples, we will follow common practices in the electrical industry so that electrical conductors on printed circuit board labeled with the same name are connected with hidden connections. The output voltage connection Vo is connected to an edge pad and three conductor lines in the fourth row, as labeled "Vo" in FIGS. 5(a, c, e). The power input connection Vn is connected to an edge pad, one conductor pad in the second row, and one conductor pad in the fourth row, as labeled "Vn" in FIGS. 5(a, c, e). The other power input connection Vp is connected to an edge pad, one conductor pad in the second row, and one conductor pad in the fourth row, as labeled "Vp" in FIGS. 5(a, c, e).

Figure 4B:
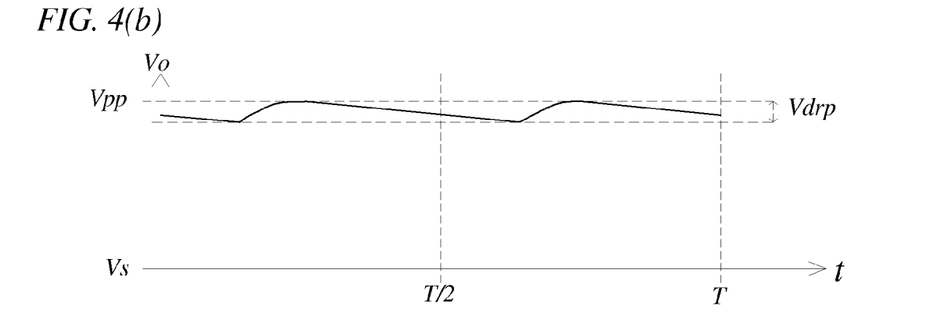
Figure 4C:
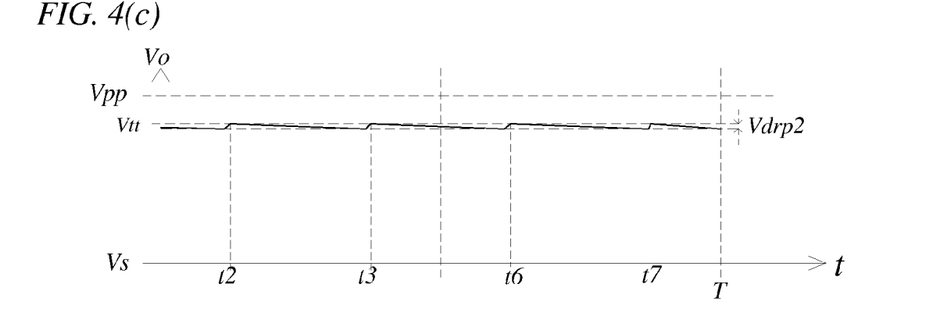
Figure 4D:
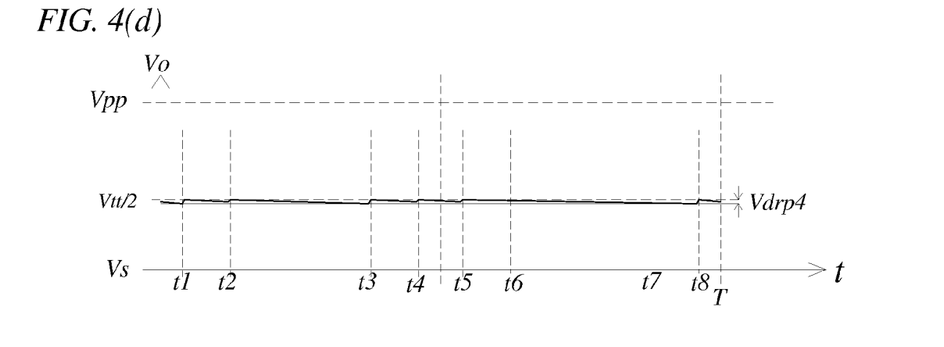
FIG. 4(d) shows an example of the output waveform when the electrical switching circuit in FIG. 3(a) is using the mechanical switches illustrated in FIGS. 6(a-l)
Figure 5A:
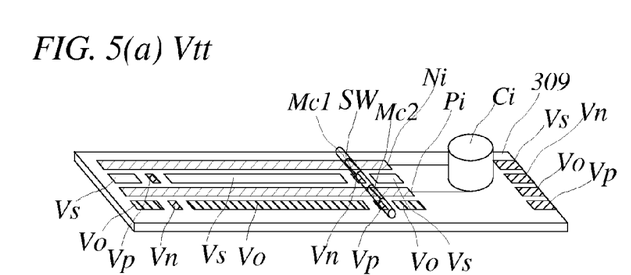
Figure 5B:
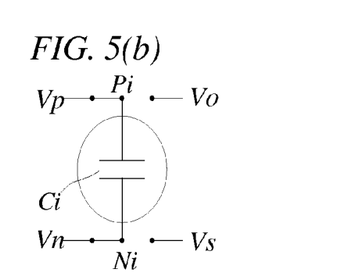
Figure 5C:
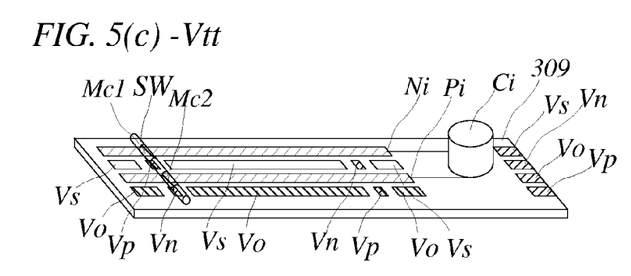
Figure 5D:
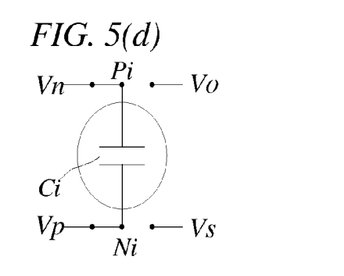
Figure 5E:
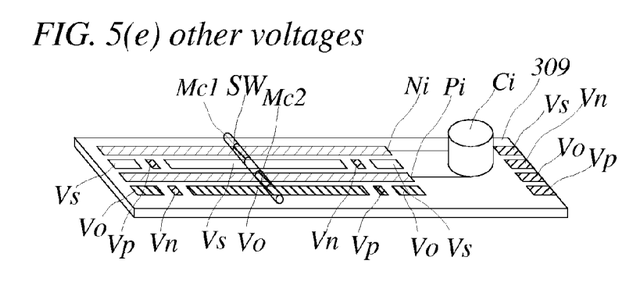
Figure 5F:
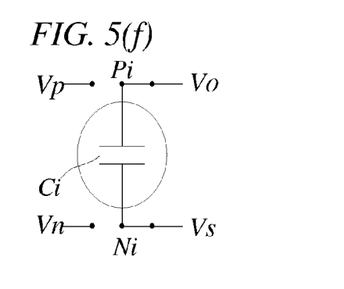
Figure 6A:
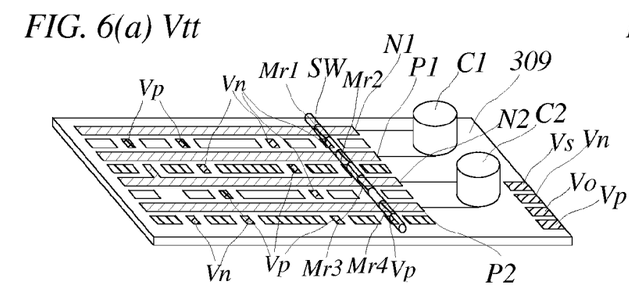
Figure 6B:
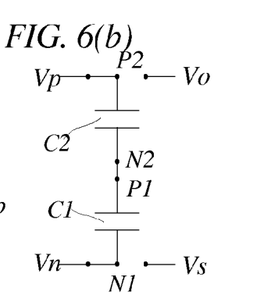
Figure 6C:
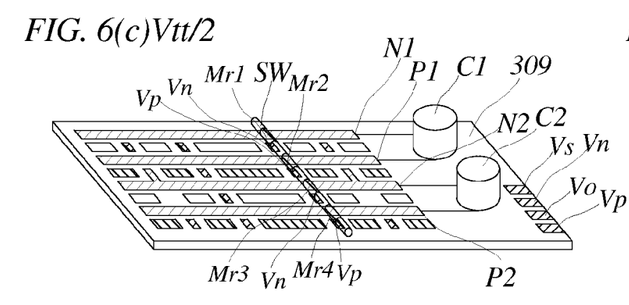
Figure 6D:
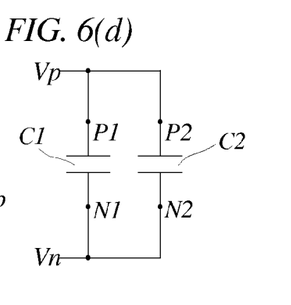
Figure 6E:
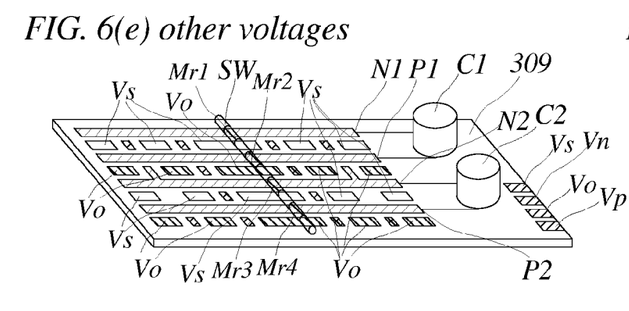
Figure 6F:
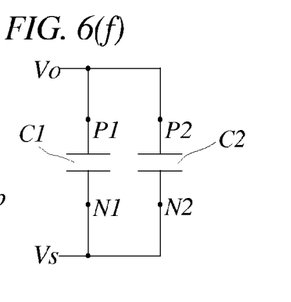
Figure 6G:
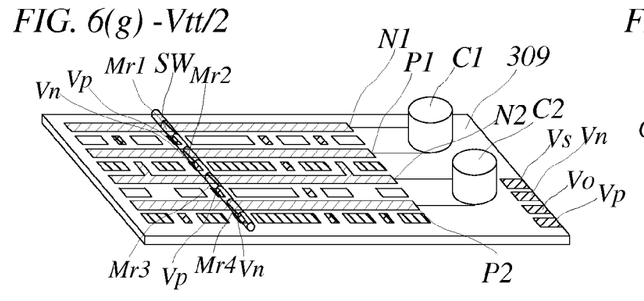
Figure 6H:
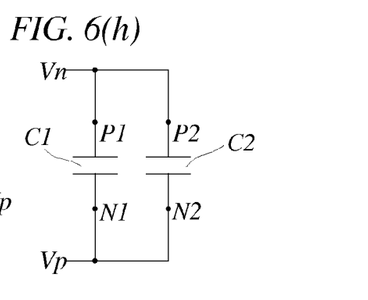
Figure 6I:
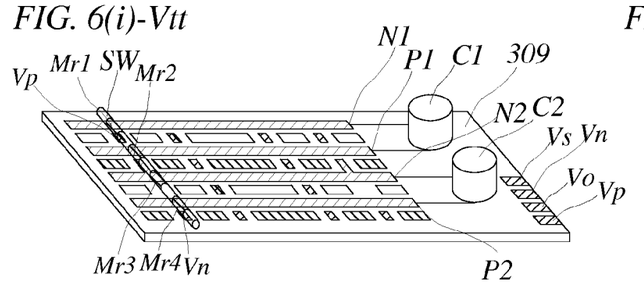
Figure 6J:
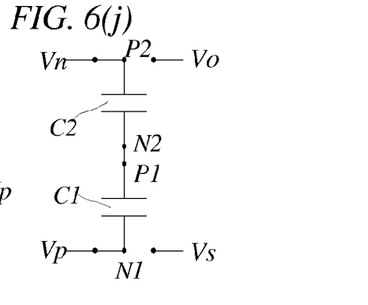
Figure 6K:
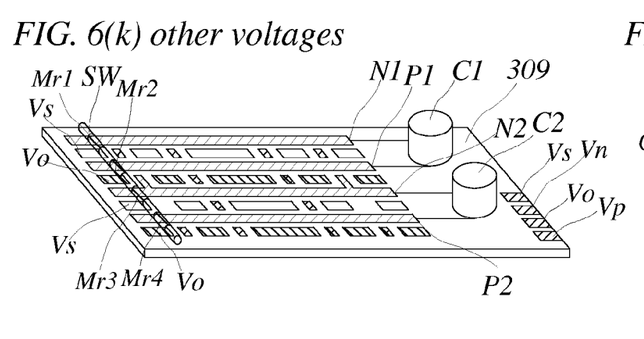
Figure 6L:
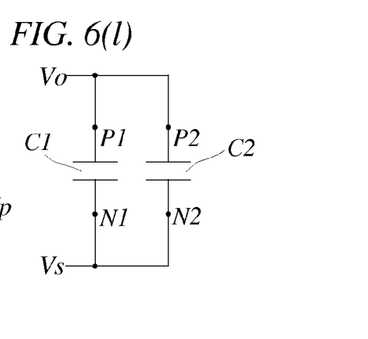

In this example, the first conductor ring (Mc1) on the movable rod (SW) and top two rows of conductor lines on the printed circuit board (309) form a mechanical switch that provides switching configurations to turn on electrical connections from Ni to Vs, Vn or Vp depending on the positions of the movable conductor ring (MC1). The second conductor ring (Mc2) on the movable rod (SW) and the bottom two rows of conductor lines on the printed circuit board (309) form a mechanical switch that provides switching configurations to turn on electrical connections from Pi to Vo, Vp or Vn depending on the positions of the movable conductor ring (Mc2). The positions of the movable rod (SW) are controlled so that when the voltage difference between Vp and Vn is at a voltage Vtt, Ni is connected to Vn through Mc1, and Pi is connected to Vp through Mc2, as illustrated in FIG. 5(a). Under this condition, the circuit configuration is shown by the schematic diagram in FIG. 5(b), and the capacitor (Ci) is charged with the voltage (Vtt) on the input terminals (Vp, Vn). When the voltage difference between Vp and Vn is at a voltage −Vtt, the movable rod (SW) is moved to a position where Ni is connected to Vp through Mc1, and Pi is connected to Vn through Mc2, as illustrated in FIG. 5(c). Under this condition, the circuit configuration is similar to that in FIG. 5(a) except connections to Vp and Vn are swapped, as shown by the schematic diagram in FIG. 5(d). The capacitor (Ci) is also charged with voltage Vtt under this condition. When the voltage difference between Vp and Vn is at voltages other than Vtt or −Vtt, the movable rod (SW) is moved to positions where Ni is connected to Vs through Mc1, and Pi is connected to Vo through Mc2, as illustrated by FIG. 5(e). Under this condition, the storage capacitor (Ci) is connected to output terminals (Vo, Vs), as shown by the schematic diagram in FIG. 5(f). Therefore, the above circuit functions as a voltage converter that charges a storage capacitor with a pre-determined voltage (Vtt) whenever the amplitude of the voltage on the input power connections is equal to Vtt, and powers the circuits connected to its output terminals (Vo, Vs) at other conditions. FIG. 4(b) shows the output voltage waveform of the above circuit when the voltage Vtt is adjusted to be equal to the peak voltage (Vpp) of primary AC power sources. Under this condition, the output voltage waveform is similar to the output voltage waveform of the prior art circuit in FIG. 1(b) that was shown in FIG. 2(c), except that there is no voltage drop (Vfb) caused by forward biased semiconductor diodes. The above circuit can achieve better power efficiency because it can avoid the voltage drop (Vfb) of forward biased semiconductor diodes. The prior art circuit in FIG. 1(b) can only output voltage at Vpp−Vfb; it cannot output other voltages without the help of a transformer or other circuits. The electrical circuit in FIGS. 5(a-f) does not have this limitation. We can choose Vtt at any voltage lower than the peak voltage Vpp. FIG. 4(c) shows the output voltage waveform of the above circuit when the voltage Vtt is adjusted to be a voltage lower than Vpp. Referring to the input voltage waveform shown in FIG. 2(a), if the input voltage is equal to Vtt at time t2 and t3 of each period, and is equal to −Vtt at time t6 and t7 of each period, then the capacitor Ci would be charged with voltage Vtt at time t2, t3, t6, and t7 of each period as illustrated by the output waveform shown in FIG. 4(c). Under such conditions, the switches in the above example are switching at 4 times the frequency of the primary AC power supply. The output voltage drop (Vdrp2) can be significantly lower than that of prior art circuit (Vdrp) because the capacitor Ci is charged 4 times instead of two times in each period. Therefore, the above exemplary circuit can serve the functions of voltage converters without using semiconductor devices or transformers. Peak power efficiency better than 95% or better than 99% can be achieved with proper designs of the control mechanisms. Using feedback control mechanisms to adjust the value of Vtt, the output voltage can be controlled with excellent accuracy and stability. The size of the circuit also can be significantly smaller than that of prior art circuits. The above exemplary embodiment of the present invention also provides excellent galvanic isolation between power inputs (Vp, Vn) and the ground connection (Vs). The movable conductor rings (Mc1, Mc2) that control the mechanical switches make electrical connections in rotary motions in order to minimize mechanical frictions. Mc1 and Mc2 are attached to the same movable rod (SW) to achieve better timing control of mechanical switches.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, a feedback circuit can be used to adjust the value of Vtt automatically to reduce the ripples of the output voltage. Feedback circuits also can adjust the values of output voltages automatically. Similar circuits also can provide AC outputs instead of DC outputs. The output voltage also does not always need to be rectified. Instead of using mechanical control mechanisms, it is also possible to use electrical control circuits to control electrical-mechanical switches such as relays to build embodiments of the present invention.

The symbolic diagrams in FIGS. 6(a-l) illustrate another embodiment of the printed circuit board (309) in FIG. 3(a) that supports the functions of a voltage converter. In this example, two storage capacitors (C1, C2) of equal capacitance are placed on the printed circuit board (309). The negative terminal (N1) of the first capacitor (C1) is connected to a conductor line at the top row of the printed circuit board, and the positive terminal (P1) of the capacitor (C1) is connected to another conductor line at the third row of the printed circuit board; the negative terminal (N2) of the second capacitor (C2) is connected to a conductor line at the fifth row of the printed circuit board, and the positive terminal (P2) of the capacitor (C2) is connected to another conductor line at the seventh row of the printed circuit board, as shown in FIGS. 6(a, c, e, g, i, k). The output ground voltage connection Vs is connected to an edge pad, five conductor lines in the second row, and five conductor lines in the sixth row, as labeled "Vs" in FIGS. 6(a, c, e, g, i, k). Electrical connections formed under the surface of printed circuit boards are not shown in our figures to avoid over complexity of the figures. The output voltage connection Vo is connected to an edge pad, five conductor lines in the fourth row, and five conductor lines in the eighth row, as labeled "Vo" in FIGS. 6(a, c, e, g, i, k). The input power connection Vn is connected to an edge pad, two conductor pads in the second row, one conductor pad in the fourth row, one conductor pad in the sixth row, and two conductor pads in the eighth row, as labeled "Vn" in FIGS. 6(a, c, e, g, i, k).

The other input power connection Vp is connected to an edge pad, two conductor pads in the second row, one conductor pad in the fourth row, one conductor pad in the sixth row, and two conductor pads in the eighth row, as labeled "Vp" in FIGS. 6(*a, c, e, g, i, k*).

In this example, the movable rod (SW) comprises four conductor rings (Mr1-Mr4). The first conductor ring (Mr1) on the movable rod (SW) and top two rows of conductor lines on the printed circuit board (309) form a mechanical switch that provides switching configurations to turn on electrical connections from N1 to Vs, Vn or Vp depending on the positions of the movable conductor ring (Mr1). The second conductor ring (Mr2) on the movable rod (SW), conductor lines in the third row, and conductor lines in the forth row form a mechanical switch that provides switching configurations to turn on electrical connections from P1 to Vo, Vp or N2, depending on the positions of the movable conductor ring (Mr2). The third conductor ring (Mr3) on the movable rod (SW), conductor lines in the fifth row, and conductor lines in the sixth row form a mechanical switch that provides switching configurations to turn on electrical connections from N2 to Vs, Vn or Vp, depending on the position of the movable conductor ring (Mr3). The fourth conductor ring (Mr4) on the movable rod (SW) and the bottom two rows of conductor lines on the printed circuit board (309) form a mechanical switch that provides switching configurations to turn on electrical connections from P2 to Vo, Vp or Vn, depending on the position of the movable conductor ring (Mr4). The positions of the movable rod (SW) are controlled so that when the voltage difference between Vp and Vn is at a voltage Vtt, N1 is connected to Vn through Mr1, P1 is connected to N2 through Mr2, and P2 is connected to Vp through Mr4, as illustrated in FIG. 6(*a*). Under this condition, capacitors C1 and C2 are connected in series, and the serial capacitors are charged with the voltage (Vtt) on the power input terminals (Vp, Vn), as illustrated by the schematic diagram in FIG. 6(*b*). When the voltage difference between Vp and Vn is at Vtt/2, the movable rod (SW) is moved to a position where N1 is connected to Vn through Mr1, P1 is connected to Vp through Mr2, N2 is connected to Vn through Mr3, and P2 is connected to Vp through Mr4, as illustrated in FIG. 6(*c*). Under this condition, capacitors C1 and C2 are connected in parallel, and both capacitors are charged with the voltage (Vtt/2) on the input power terminals (Vp, Vn), as illustrated by the schematic diagram in FIG. 6(*d*). When the voltage difference between Vp and Vn is at −Vtt/2, the movable rod (SW) is moved to a position where N1 is connected to Vp through Mr1, P1 is connected to Vn through Mr2, N2 is connected to Vp through Mr3, and P2 is connected to Vn through Mr4, as illustrated in FIG. 6(*g*). Under this condition, capacitors C1 and C2 are connected in parallel, and both capacitors are charged with the voltage (Vtt/2) which is the reversed voltage on the power input terminals (Vp, Vn), as illustrated by the schematic diagram in FIG. 6(*h*). When the voltage difference between Vp and Vn is at −Vtt, the movable rod (SW) is moved to a position where N1 is connected to Vp through Mr1, P1 is connected to N2 through Mr2, and P2 is connected to Vn through Mr4, as illustrated in FIG. 6(*i*). Under this condition, capacitors C1 and C2 are connected in series, and the serial capacitors are charged with the voltage Vtt, which is the reversed voltage on the power input terminals (Vp, Vn), as illustrated by the schematic diagram in FIG. 6(*j*). When the voltage difference between Vp and Vn is at voltages other than Vtt, Vtt/2, −Vtt/2, or −Vtt, the movable rod (SW) is moved to positions where N1 is connected to Vs through Mr1, P1 is connected to Vo through Mr2, N2 is connected to Vs through Mr3, and P2 is connected to Vo through Mr4, as illustrated by FIGS. 6(*e, k*). Under such conditions, C1 and C2 are connected in parallel to output terminals (Vo, Vs), as shown by the schematic diagram in FIGS. 6(*f, l*). Therefore, the above circuit functions as a voltage converter that charges two storage capacitor with a pre-determined voltage (Vtt/2) whenever the amplitude of the voltage on the input power connections is equal to Vtt, Vtt/2, −Vtt/2, or −Vtt. At other voltages, the storage capacitors (C1, C2) dump their charges to the circuit connected to its output terminals (Vo, Vs) at an output voltage equals Vtt/2. FIG. 4(*d*) shows the output voltage waveform of the above circuit. Referring to the input voltage waveform shown in FIG. 2(*a*), if the input voltage is equal to Vtt at time t2 and t3 of each period, is equal to Vtt/2 at time t1 and t4 of each period, is equal to −Vtt/2 at time t5 and t8 of each period, and is equal to −Vtt at time t6 and t7 of each period, then the capacitors C1 and C2 would be charged with voltage Vtt/2 at time t1-t8 of each period, as illustrated by the output waveform shown in FIG. 4(*d*). Under such conditions, the switches in the above example are switching at 8 times the frequency of the primary AC power supply. The output voltage drop (Vdrp4) can be significantly lower than that of prior art circuit (Vdrp) because capacitors C1 and C2 are charged 8 times instead of two times in each period. Therefore, the above example can serve the functions of voltage converters without using semiconductor devices or transformers. Peak power efficiency better than 95% or better than 99% can be achieved with proper designs of the driving mechanisms. Using a feedback mechanism to adjust the value of Vtt, the output voltage can be controlled with excellent accuracy and stability. The size of the circuit also can be significantly smaller than prior art circuits. The above exemplary embodiment of the present invention also provides excellent galvanic isolation between power inputs (Vp, Vn) and ground connections (Vs). The movable conductor rings (Mr1-Mr4) that control the mechanical switches make electrical connections in rotary motions in order to minimize mechanical frictions. Mr1-Mr4 are attached to the same movable rod (SW) to achieve excellent timing control.

While the preferred embodiments have been illustrated and described herein, other modifications and changes will be evident to those skilled in the art. It is to be understood that there are many other possible modifications and implementations so that the scope of the invention is not limited by the specific embodiments discussed herein. Electrical circuits in the above examples charge two capacitors, while similar circuits can be used to charge any number of capacitors; besides capacitors, similar circuits also can be used to power batteries, light emitting diodes, integrated circuits, switching circuits, or other types of electrical circuits/components. The above examples are simplified for clarity, while switching circuits of the present invention can support very complex functions. For example, the number of output voltage terminals can be more than two. Embodiments of the present invention are able to support wide varieties of output voltage to support many types of electrical equipment. The number of input connections also can be more than two; three input connections maybe needed for three-phase power sources. The control mechanisms to control the positions of the movable conductors in mechanical switches can be implemented in a wide variety of ways. The position of the movable structure does not need to be linearly proportional to the input voltage, it can be any function of the input voltage, or even unrelated to the input voltage. Instead of mechanical control mechanisms, electrical control mechanism or other types of control mechanisms also can be used. The mechanical switches in the above example are controlled by a movable rod (SW) moving in linear motion, while the movable conductors of mechanical switches of the present invention can be implemented in other ways.

FIGS. 7(a-f) are symbolic diagrams illustrating exemplary structures of an embodiment of the present invention that uses a rotary structure to synchronize switching operations of mechanical switches. An primary power source (300) is connected to the inputs of a printed circuit board (709); The negative terminal (Vn) of the voltage source (300) is also connected to one terminal of a magnetic coil (303); The other terminal of the magnetic coil (303) is connected to one terminal of a variable resistor (Rv), while the other end of the variable resistor is connected to the positive terminal (Vp) of the AC power source (300). An iron core (305) is placed inside of the magnetic coil (303), which is placed near a permanent magnet (301). The iron core is connected to a set of gears (707). Instead of moving a movable rod (SW) like the example in FIG. 3(a), the gears (707) in this example rotate a rotary rod (RS) inside a set of mechanical switches (708) placed on top of the printed circuit board (709).

Figure 7A:
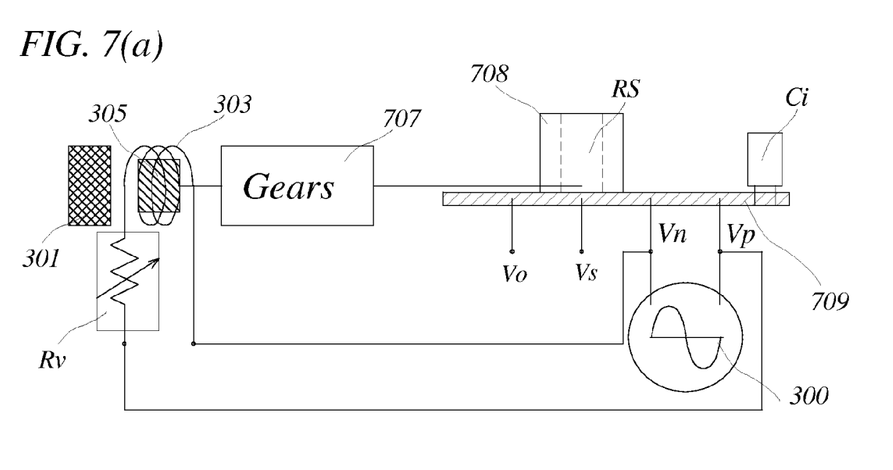
Figure 7B:
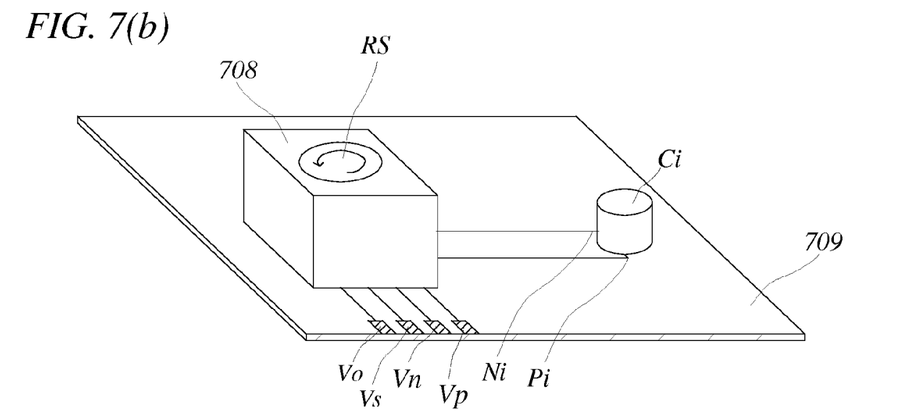

FIG. 7(b) is a three-dimensional diagram illustrating structures of the printed circuit board (709) and the rotary mechanical switches (708) in FIG. 7(a). In this example, the terminals (Ni, Pi) of a storage capacitor (Ci), the power input connections (Vp, Vn), and the output voltage connections (Vo, Vs) are all connected to the terminals of the rotary mechanical switches (708).

FIGS. 7(c-f) show cross-section views of the rotary mechanical switches (708) in FIG. 7(b). Metal balls (731-736, 741-746) are placed between the rotary rod (RS) and the wall of the container (739) of the rotary mechanical switches (708). These metal balls (731-736, 741-746) reduce the friction between the rotary rod (RS) and the container (739), and they also provide electrical contacts to conductor pads (737-740) on the rotary rod (RS). The metal balls (731-736, 741-746) and the conductor pads (737-740) on the rotary rod (RS) form mechanical switches that control the electrical connections between those electrical signals (Ni, Pi, Vp, Vn, Vo, Vs) depending on the positions of the rotary rod (RS).

Figure 7C:
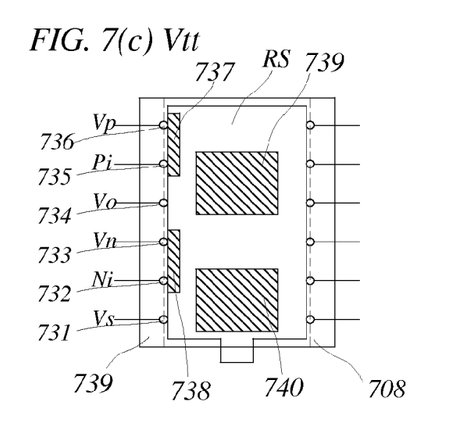
Figure 7D:
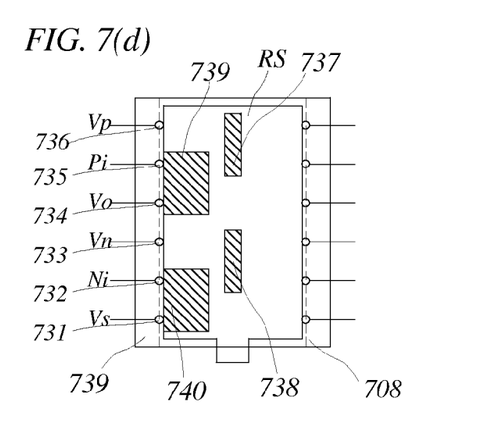
Figure 7E:
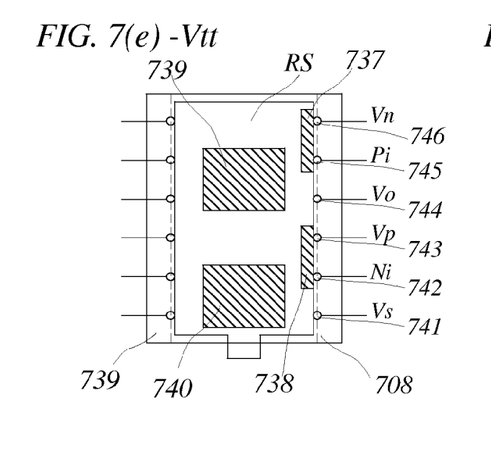
Figure 7F:
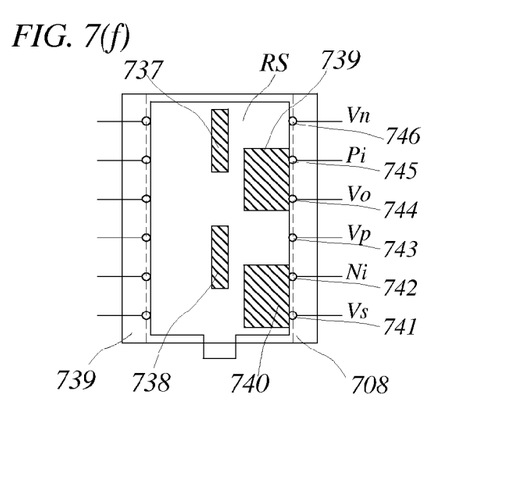

The motions of the rotary rod (RS) can be calibrated accurately by adjusting the value of the variable resistor (Rv) and/or the parameters of the gears (707). For example, we can adjust those parameters so that when the input voltage difference between Vp and Vn is at a pre-determined voltage Vtt, the rotary rod (RS) is at the position illustrated in FIG. 7(c). At this position, Pi is connected to Vp through a conductor pad (737); Ni is connected to Vn through another conductor pad (738), as illustrated in FIG. 7(c). Under this condition, the circuit configuration is the same as that shown by the schematic diagram in FIG. 5(b). When the input voltage difference between Vp and Vn is at a −Vtt, the rotary rod (RS) is at the position illustrated in FIG. 7(e). At this position, Pi is connected to Vn through a conductor pad (737); Ni is connected to Vp through another conductor pad (738), as illustrated in FIG. 7(e). Under this condition, the circuit configuration is the same as that shown by the schematic diagram in FIG. 5(d). When the input voltage difference between Vp and Vn is at other voltages, Pi is connected to Vo through a wider conductor pad (739), Ni is connected to Vs through another wider conductor pad (740), as illustrated in FIGS. 7(d, f). Under those conditions, the circuit configuration is the same as that shown by the schematic diagram in FIG. 5(f). Therefore, the switching circuits of this example can provide the same functions as the switching circuits illustrated in FIGS. 5(a-f). The output waveform would be similar to the waveform shown in FIG. 4(d).

Mechanical switches using a rotary rod (RS) typically can be smaller than mechanical switches that use a movable rod (SW) in linear motions. Typically, rotary rods also can operate at higher frequencies; switching frequencies at thousands of cycles per second or higher can be achieved.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, instead of supporting the functions of a voltage converter, the rotary mechanical switches in the above example also can support the functions of rectifying circuits, voltage converters, and a wide variety of other applications. The rotary rod in the above example is driven by the same mechanism illustrated in FIG. 3(a), while it also can be driven by other types of mechanisms such as an electrical motor. The driving force also does not have to be the primary power source.

The above exemplary embodiments of the present invention support first stage electrical power input circuits that prepare the power inputs from the primary AC power supply in a building into proper waveforms suitable to power next stage electrical circuits. To function as a power input circuit, an embodiment of the present invention comprises two electrical power input connections (Vp, Vn) that allow electrically operated equipment to be connected to two terminals of the primary AC power supply in a building. Sometimes we can have more than two power input connections. For example, it may have three power input connections to support three-phase power sources. The above exemplary embodiments of the present invention use synchronized mechanical switches to achieve high power efficiency. Design of mechanical switches can be very complex, and those switches maybe used to control many electrical components. As power input circuits, an embodiment of the present invention typically comprises a mechanical switch (SWp) that provides switching configurations to turn on electrical connections to Vp depending on the positions of a movable conductor, and another mechanical switch (SWn) that provides switching configurations to turn on electrical connections to Vn depending on the positions of a movable conductor. SWp and SWn may have many other switching configurations, and they may be used to control other signals. SWp and SWn also may work with many other switches. The motions of the movable conductor of SWp and the movable conductor of SWn are controlled so that the timing when SWp is switched to turn on electrical connections to Vp and the timing when SWn is switched to turn on electrical connections to Vn are synchronized, while SWp and SWn are capable of switching at a switching frequency equal to or higher than the frequency of the primary AC power supply in a building. An embodiment of the present invention also can comprise a mechanical switch (SW1) that provides switching configurations to turn on electrical connections to Vp or Vn depending on the positions of a movable conductor, and another mechanical switch (SW2) that provides switching configurations to turn on electrical connections to Vn or Vp depending on the positions of a movable conductor, wherein the motions of the movable conductors of SW1 and SW2 are controlled so that when the voltage difference between Vp and Vn is higher than a threshold voltage (Vee), SW1 can only turn on the electrical connection to Vp but not to Vn, and SW2 can only turn on the connection to Vn but not to Vp, and when the voltage difference between Vp and Vn is lower than Vee, SW1 can only turn on the electrical connection to Vn but not to Vp, and SW2 can only turn on the connection to Vp but not to Vn, while SWp and SWn are capable of switching at a switching frequency equal to or higher than the frequency of the primary AC power supply in a building. The critical voltage Vee can be the voltage on one of the power input connections (Vp, Vn), the average voltage of the voltages on the power input connections (Vp, Vn), or other voltages. When an embodiment of the present invention is an electrical power input circuit, it would comprise one or both of the above two configurations of mechanical switches that control power input connections. Embodiments of the present invention may comprise complex combination of mechanical switches that control many electrical components such as capacitors, batteries, integrated circuits, light emitting diodes, and so on. The movable conductors that control the mechanical switches in the electrical circuit can be attached to movable structures in rotary motions. To achieve accurate timing control, movable conductors that control the mechanical switches in the electrical circuit can be attached to the same movable structure. Mechanical switches designed in such ways typically are capable of operating at a switching frequency equal to or higher than 4 times the frequency of the primary AC power supply in a building. Wide varieties of applications, such as voltage converters or rectifying circuits, can be supported by embodiments of the present invention. Because of near perfect impedances of mechanical switches, embodiments of the present invention typically provide output voltages with better than 95% or better than 99% of power efficiency. Galvanic isolation between power inputs and ground connections also can be achieved.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. An electrical circuit comprising:
    Two electrical power input connections (Vp, Vn) that allow electrically operated equipment to be connected to two terminals of the primary AC power supply in a building,
    A mechanical switch that provides switching configurations to turn on electrical connections to Vp depending on the positions of a movable conductor, where a mechanical switch is defined as an electrical switch that comprises a movable conductor that connects or disconnects its terminals according to the positions of the movable conductor, and that the electrical connections made by the mechanical switch are formed by direct contact between electrical conductors, and
    Another mechanical switch that provides switching configurations to turn on electrical connections to Vn depending on the positions of a movable conductor;
    Wherein the motions of said movable conductor of said mechanical switch that provides switching configurations to turn on electrical connections to Vp and said movable conductor of said mechanical switch that provides switching configurations to turn on electrical connections to Vn are controlled so that the timing when said mechanical switch that provides switching configurations to turn on electrical connections to Vp is switched to turn on electrical connections to Vp and the timing when said mechanical switch that provides switching configurations to turn on electrical connections to Vn is switched to turn on electrical connections to Vn are synchronized, while said mechanical switch that provides switching configurations to turn on electrical connections to Vp and said mechanical switch that provides switching configurations to turn on electrical connections to Vn are capable of switching at a switching frequency equal to or higher than the frequency of the primary AC power supply in a building.

2. The movable conductors that control the mechanical switches in the electrical circuit in claim 1 are attached to movable structures in rotary motions.

3. The movable conductors that control the mechanical switches in the electrical circuit in claim 1 are attached to the same movable structure.

4. The movable conductors that control the mechanical switches in the electrical circuit in claim 1 are attached to the same movable structure that is in rotary motion.

5. The mechanical switches in the electrical circuit in claim 1 are capable of operating at a switching frequency equal to or higher than 4 times the frequency of the primary AC power supply in a building.

6. The electrical circuit in claim 1 provides rectified out voltages without the need to use semiconductor devices.

7. The electrical circuit in claim 1 provides the functions of a voltage converter.

8. The electrical circuit in claim 1 provides galvanic isolation between power inputs and ground connections.

9. The electrical circuit in claim 1 provides output voltages with better than 95% peak power efficiency.

10. The electrical circuit in claim 1 provides output voltages with better than 99% peak power efficiency.

11. An electrical circuit comprising:
    Two electrical power input connections (Vp, Vn) that allow electrically operated equipment to be connected to two terminals of the primary AC power supply in a building,
    A first mechanical switch that provides switching configurations to turn on electrical connections to Vp or Vn depending on the positions of a movable conductor, where a mechanical switch is defined as an electrical switch that comprises a movable conductor that connects or disconnects its terminals according to the positions of the movable conductor, and that the electrical connections made by the mechanical switch are formed by direct contact between electrical conductors, and
    A second mechanical switch that provides switching configurations to turn on electrical connections to Vn or Vp depending on the positions of a movable conductor;
    Wherein the motions of the movable conductors of said first mechanical switch and said second mechanical switch are controlled so that when the voltage difference between Vp and Vn is higher than a threshold voltage (Vee), said first mechanical switch can only turn on an electrical connection to Vp but not to Vn, and said second mechanical switch can only turn on a connection to Vn but not to Vp, and when the voltage difference between Vp and Vn is lower than Vee, said first mechanical switch can only turn on an electrical connection to Vn but not to Vp, and said second mechanical switch can only turn on a connection to Vp but not to Vn, while said first mechanical switch and said second mechanical switch are capable of switching at a switching frequency equal to or higher than the frequency of the primary AC power supply in a building.

12. The critical voltage Vee used to control the mechanical switches in the electrical circuit in claim 11 is the voltage on one of the power input connections (Vp or Vn).

13. The critical voltage Vee used to control the mechanical switches in the electrical circuit in claim 11 is the average voltage of the voltages on the power input connections (Vp, Vn).

14. The movable conductors that control the mechanical switches in the electrical circuit in claim 11 are attached to movable structures in rotary motion.

15. The movable conductors that control the mechanical switches in the electrical circuit in claim 11 are attached to the same movable structure.

16. The movable conductors that control the mechanical switches in the electrical circuit in claim 11 are attached to the same movable structure that is in rotary motions.

17. The mechanical switches in the electrical circuit in claim 11 are capable of operating at a switching frequency equal to or higher than 4 times the frequency of the primary AC power supply in a building.

18. The electrical circuit in claim 11 provides rectified out voltages without the needs to use semiconductor devices.

19. The electrical circuit in claim 11 provides the functions of a voltage converter.

20. The electrical circuit in claim 11 provides galvanic isolation between power inputs and ground connections.

* * * * *